US012735560B2

(12) United States Patent
Sekiguchi et al.

(10) Patent No.: US 12,735,560 B2
(45) Date of Patent: Sep. 15, 2026

(54) POLYPROPYLENE-BASED RESIN COMPOSITION, HYDROGENATED BLOCK COPOLYMER, MOLDED ARTICLE, AND INTERIOR-EXTERIOR DECORATIVE MATERIAL FOR AUTOMOBILES

(71) Applicant: KURARAY CO., LTD., Okayama (JP)

(72) Inventors: Takahiro Sekiguchi, Ibaraki (JP); Yasushi Senda, Ibaraki (JP)

(73) Assignee: KURARAY CO., LTD., Okayama (JP)

(*) Notice: Subject to any disclaimer, the term of this patent is extended or adjusted under 35 U.S.C. 154(b) by 808 days.

(21) Appl. No.: 18/018,134

(22) PCT Filed: Jul. 29, 2021

(86) PCT No.: PCT/JP2021/028090

§ 371 (c)(1),
(2) Date: Jan. 26, 2023

(87) PCT Pub. No.: WO2022/025177

PCT Pub. Date: Feb. 3, 2022

(65) Prior Publication Data

US 2023/0265271 A1 Aug. 24, 2023

(30) Foreign Application Priority Data

Jul. 30, 2020 (JP) ................................ 2020-129205

(51) Int. Cl.
*C08L 23/12* (2006.01)

(52) U.S. Cl.
CPC ......... *C08L 23/12* (2013.01); *C08L 2205/025* (2013.01); *C08L 2205/03* (2013.01); *C08L 2207/062* (2013.01)

(58) Field of Classification Search
CPC .... C08L 23/0815; C08L 23/12; C08L 53/025; C08F 297/04; C08F 8/04
See application file for complete search history.

(56) References Cited

U.S. PATENT DOCUMENTS

| | | | |
|---|---|---|---|
| 5,492,967 | A | 2/1996 | Djiauw et al. |
| 6,310,138 | B1 | 10/2001 | Yonezawa et al. |
| 2012/0010351 | A1 | 1/2012 | Yoshifumi et al. |
| 2017/0218147 | A1 | 8/2017 | Nojima et al. |
| 2018/0030195 | A1 | 2/2018 | Oshita et al. |
| 2020/0407481 | A1 | 12/2020 | Tsunoi et al. |
| 2021/0061975 | A1 | 3/2021 | Yoshida |
| 2023/0040426 | A1 | 2/2023 | Horiguchi et al. |

FOREIGN PATENT DOCUMENTS

| | | |
|---|---|---|
| CN | 111742010 B | 3/2023 |
| CN | 114828803 B | 8/2024 |
| JP | 07-188481 | 7/1995 |
| JP | 11-130910 | 5/1999 |
| JP | 2001-106844 | 4/2001 |
| JP | 2005-320459 | 11/2005 |
| JP | 2020-001800 | 1/2020 |
| WO | 99/64489 | 12/1999 |
| WO | 2010/104174 | 9/2010 |
| WO | 2016/039257 | 3/2016 |
| WO | 2019/167745 | 9/2019 |

OTHER PUBLICATIONS

Official communication issued in EP Patent Application No. 21849162.9, Aug. 26, 2024.
ISR/WO issued in International Patent Application No. PCT/JP2021/028090, Oct. 12, 2021, translation.
IPRP issued in Int'l Patent Application No. PCT/JP2021/028090, Jan. 31, 2023, translation.

*Primary Examiner* — Mark S Kaucher
(74) *Attorney, Agent, or Firm* — GREENBLUM & BERNSTEIN, P.L.C.

(57) ABSTRACT

A polypropylene-based resin composition, a hydrogenated block copolymer contained in the polypropylene-based resin composition, a molded article containing the polypropylene-based resin composition, and an interior-exterior decorative material for automobiles, which includes the molded article. The polypropylene-based resin composition contains a polypropylene-based polymer (A), an ethylene-α-olefin copolymer rubber (B), and a hydrogenated block copolymer (C). In the polypropylene-based resin composition, the hydrogenated block copolymer (C) is a hydrogenated product of a block copolymer having at least one polymer block (C-1) mainly composed of an aromatic vinyl compound unit, and having at least one polymer block (C-2) mainly composed of a butadiene (Bd) unit and an isoprene (Ip) unit, a content of the aromatic vinyl compound units in the hydrogenated block copolymer is less than 30% by mass, and a vinyl bond amount of the polymer block (C-2) is 20% or less.

13 Claims, No Drawings

POLYPROPYLENE-BASED RESIN COMPOSITION, HYDROGENATED BLOCK COPOLYMER, MOLDED ARTICLE, AND INTERIOR-EXTERIOR DECORATIVE MATERIAL FOR AUTOMOBILES

TECHNICAL FIELD

The present invention relates to a polypropylene-based resin composition, a hydrogenated block copolymer, a molded article, and an interior-exterior decorative material for automobiles, and particularly relates to a polypropylene-based resin composition, a hydrogenated block copolymer contained in the polypropylene-based resin composition, a molded article containing the polypropylene-based resin composition, and an interior-exterior decorative material for automobiles, which includes the molded article.

BACKGROUND ART

The polypropylene-based resin composition is generally excellent in chemical resistance or mechanical properties, and thus is widely used as a material for various products such as machine parts or automobile parts.

PTL 1 discloses a propylene-based resin composition including a polypropylene-based resin, a rubbery polymer, and a hydrogenated block copolymer.

PTL 2 discloses a polypropylene-based resin composition containing a hydrogenated block copolymer composed of two vinyl aromatic hydrocarbon compound polymer blocks A and one hydrogenated butadiene polymer block B, in which 90% or more of olefinically unsaturated double bonds in an unhydrogenated butadiene polymer block are hydrogenated.

PTL 3 discloses a polypropylene-based resin composition containing 50 to 90% by mass of a polypropylene-based polymer (A), 5 to 50% by mass of an ethylene-α-olefin copolymer (B), and 0.1 to 5% by mass of a copolymer, in which vinyl aromatic monomer units and alkylene monomer units are main components, and the content of α-olefin monomer units in the total of alkylene monomers is 45 mol % or more.

CITATION LIST

Patent Literature

PTL 1: JP 2001-106844 A
PTL 2: WO 99/64489
PTL 3: WO 2010/104174

SUMMARY OF INVENTION

Technical Problem

However, due to recent pursuit of functionality or economic efficiency in various products, as the products become thinner, there is a demand for a polypropylene-based resin composition excellent in impact resistance, especially impact resistance at a low temperature, whereas in conventional products, there is a room for further improvement in terms of impact resistance, especially impact resistance at a low temperature.

Therefore, an object of the present invention is to provide a polypropylene-based resin composition excellent in impact resistance, especially impact resistance at a low temperature, a hydrogenated block copolymer contained in the polypropylene-based resin composition, a molded article containing the polypropylene-based resin composition, and an interior-exterior decorative material for automobiles, which includes the molded article.

Solution to Problem

The present inventors have conducted intensive studies in order to solve the above problems, and as a result, found that the above problems can be solved by containing a polypropylene-based polymer (A), an ethylene-α-olefin copolymer rubber (B), and a hydrogenated block copolymer (C) in which the content of aromatic vinyl compound units is less than 30% by mass, and the vinyl bond amount of a polymer block (C-2) is 20% or less, thereby completing the present invention.

That is, the present invention is as follows.

[1] A polypropylene-based resin composition including: a polypropylene-based polymer (A), an ethylene-α-olefin copolymer rubber (B), and a hydrogenated block copolymer (C), in which the hydrogenated block copolymer (C) is a hydrogenated product of a block copolymer having at least one polymer block (C-1) mainly composed of an aromatic vinyl compound unit, and having at least one polymer block (C-2) mainly composed of a butadiene (Bd) unit and an isoprene (Ip) unit, a content of the aromatic vinyl compound unit in the hydrogenated block copolymer (C) is less than 30% by mass, and a vinyl bond amount of the polymer block (C-2) is 20% or less.

[2] The polypropylene-based resin composition described in [1], in which a content of the ethylene-α-olefin copolymer rubber (B) is 1 to 50 parts by mass relative to 100 parts by mass of the polypropylene-based polymer (A), and a content of the hydrogenated block copolymer (C) is 1 to 50 parts by mass relative to 100 parts by mass of the polypropylene-based polymer (A).

[3] The polypropylene-based resin composition described in [1] or [2], in which a melt flow rate value (MFR) obtained under conditions of a temperature of 230° C. and a load of 2.16 kgf in accordance with JIS K7210 is 3 to 200 g/10 min.

[4] The polypropylene-based resin composition described in any one of [1] to [3], in which the polypropylene-based polymer (A) has a melt flow rate value (MFR) of 1 to 200 g/10 min, which is obtained under conditions of a temperature of 230° C. and a load of 2.16 kgf in accordance with JIS K7210.

[5] The polypropylene-based resin composition described in any one of [1] to [4], in which the ethylene-α-olefin copolymer rubber (B) has a melt flow rate value (MFR) of 0.1 to 50 g/10 min, which is obtained under conditions of a temperature of 230° C., and a load of 2.16 kgf in accordance with JIS K7210.

[6] The polypropylene-based resin composition described in any one of [1] to [5], in which the ethylene-α-olefin copolymer rubber (B) is at least one type selected from the group consisting of an ethylene-propylene copolymer, an ethylene-butene copolymer and an ethylene-octene copolymer.

[7] The polypropylene-based resin composition described in [6], in which the ethylene-α-olefin copolymer rubber (B) is the ethylene-octene copolymer.

[8] The polypropylene-based resin composition described in any one of [1] to [7], further including a high-density polyethylene.

[9] The polypropylene-based resin composition described in any one of [1] to [8], in which the hydrogenated block copolymer (C) has a melt flow rate value (MFR) of 0.1 to 50 g/10 min, which is obtained under conditions of a temperature of 230° C. and a load of 2.16 kgf in accordance with JIS K7210.

[10] The polypropylene-based resin composition described in any one of [1] to [9], in which the hydrogenated block copolymer (C) is a triblock copolymer of polystyrene-hydrogenated butadiene/isoprene copolymer-polystyrene, or a diblock copolymer of polystyrene-hydrogenated butadiene/isoprene copolymer.

[11] A hydrogenated block copolymer (C) that is a hydrogenated product of a block copolymer having a polymer block (C-1) mainly composed of an aromatic vinyl compound unit, a polymer block (C-2) mainly composed of a butadiene (Bd) unit and an isoprene (Ip) unit, and a polymer block (C-3) mainly composed of an isoprene (Ip) unit-derived structural unit (but, excluding the polymer block (C-2)), in which the hydrogenated block copolymer (C) is a tetrablock copolymer whose bonding type is represented by A-B-A-C when the polymer block (C-1), the polymer block (C-2), and the polymer block (C-3) are represented by A, B, and C, respectively.

[12] The hydrogenated block copolymer (C) described in [11], in which a vinyl bond amount of the polymer block (C-2) is 20% or less.

[13] The hydrogenated block copolymer (C) described in [11] or [12], in which a ratio of the polymer block (C-3) in the hydrogenated block copolymer (C) is 40% by mass or less of the entire hydrogenated block copolymer (C).

[14] The hydrogenated block copolymer (C) described in any one of [11] to [13], in which a vinyl bond amount of the polymer block (C-3) is 20% or less.

[15] The hydrogenated block copolymer (C) described in any one of [11] to [14], in which a content of the isoprene (Ip)-derived structural unit in the polymer block (C-3) is 70% by mass or more based on a total mass of the polymer block (C-3).

[16] The hydrogenated block copolymer (C) described in any one of [11] to [15], in which a hydrogen-addition rate (hydrogenation rate) of the polymer block (C-3) in the hydrogenated block copolymer (C) is 80 mol % or more.

[17] A molded article containing the polypropylene-based resin composition described in any one of [1] to [10].

[18] An interior-exterior decorative material for automobiles, which includes the molded article described in [17].

Advantageous Effects of Invention

According to the present invention, it is possible to provide a polypropylene-based resin composition excellent in impact resistance, especially impact resistance at a low temperature, a hydrogenated block copolymer contained in the polypropylene-based resin composition, a molded article containing the polypropylene-based resin composition, and an interior-exterior decorative material for automobiles, which includes the molded article.

DESCRIPTION OF EMBODIMENTS

Hereinafter, the present invention will be described in detail.

In this specification, any definition that is considered preferable can be arbitrarily adopted, and it can be said that a combination of preferable ones is more preferred.

Further, in this specification, description of "XX to YY" means "XX or more and YY or less".

Further, in this specification, regarding a desirable numerical range (for example, a range of a content or the like), lower limit values and upper limit values described in stages may be combined independently from each other.

For example, from the description of "preferably 10 to 90, more preferably 30 to 60", a "preferable lower limit value (10)" and a "more preferable upper limit value (60)" can also be combined to form "10 to 60". Further, in the numerical range described in the present specification, the upper limit value or the lower limit value in the numerical range may be replaced with the values illustrated in Examples.

Further, in this specification, "~ unit" (here, "~" indicates a monomer) means a "structural unit derived from ~", and for example, an "aromatic vinyl compound unit" means a "structural unit derived from an aromatic vinyl compound".

Further, in this specification, the weight average molecular weight is a weight average molecular weight on conversion of standard polystyrene, which is obtained by gel permeation chromatography (GPC) measurement as in Examples, and the number average molecular weight is a number average molecular weight on conversion of standard polystyrene, which is obtained by gel permeation chromatography (GPC) measurement.

Furthermore, in this specification, the "high-density polyethylene" means polyethylene with a density of 0.94 g/$cm^3$ or more.

[Polypropylene-Based Resin Composition]

A polypropylene-based resin composition according to the present invention contains a polypropylene-based polymer (A), an ethylene-α-olefin copolymer rubber (B), and a hydrogenated block copolymer (C). In the polypropylene-based resin composition, the hydrogenated block copolymer (C) is a hydrogenated product of a block copolymer having at least one polymer block (C-1) mainly composed of an aromatic vinyl compound unit, and having at least one polymer block (C-2) mainly composed of a butadiene (Bd) unit and an isoprene (Ip) unit. The content of the aromatic vinyl compound unit in the hydrogenated block copolymer is less than 30% by mass and the vinyl bond amount in the polymer block (C-2) is 20% or less.

In this specification, the "polypropylene-based resin composition" indicates that the content of the polypropylene-based polymer (A) is 40% by mass or more.

In this specification, "the content of the aromatic vinyl compound units" is a value measured by $^1$H-NMR as in Examples to be described below.

The melt flow rate value (MFR) of the polypropylene-based resin composition is not particularly limited, and a preferable value can be selected according to the desired shape of a molded article and the molding method of the molded article. When the polypropylene-based resin composition of the present invention is molded by injection molding, the MFR of the polypropylene-based resin composition is preferably 3 to 200 g/10 min, more preferably 3 to 150 g/10 min, particularly preferably 5 to 125 g/10 min. When the melt flow rate value (MFR) of the polypropylene-based resin composition is the lower limit value or more, during injection molding, a required flow distance is obtained, and thus the appearance of the molded article tends to be excellent even if thin molding is performed. Meanwhile, when the MFR is the upper limit value or less, the impact resistance tends to be good.

When the polypropylene-based resin composition of the present invention is molded through extrusion pipe molding, the MFR of the polypropylene-based resin composition is preferably 0.05 to 10 g/10 min, more preferably 0.1 to 5 g/10 min, particularly preferably 0.2 to 1.5 g/10 min. The MFR within the above-described range is preferable from the viewpoint of parison stability during pipe extrusion molding.

Further, when the polypropylene-based resin composition of the present invention is molded through extrusion blow molding, the MFR of the polypropylene-based resin composition is preferably 0.05 to 10 g/10 min, more preferably 0.1 to 5 g/10 min, particularly preferably 0.2 to 1.5 g/10 min. The MFR within the above-described range is preferred. When the MFR of the polypropylene-based resin composition is the lower limit value or more, it becomes easy to mold a blow-molded body with a large size and a complicated shape. Meanwhile, when the MFR is the upper limit value or less, the drawdown resistance of parison and the impact resistance of the blow-molded article tend to be good.

In this specification, the "melt flow rate value (MFR)" is a value measured under conditions of a temperature of 230° C. and a load of 2.16 kgf in accordance with JIS K7210 as in Examples to be described below.

Hereinafter, the polypropylene-based polymer (A), the ethylene-α-olefin copolymer rubber (B), and the hydrogenated block copolymer (C), which are contained in the polypropylene-based resin composition, and other components which may be contained as necessary will be described in order in detail.

(Polypropylene-Based Polymer (A))

The polypropylene-based polymer (A) may be homo polypropylene (homo PP) or may be a copolymer of propylene with other monomers, but homo polypropylene is preferred for applications where a higher rigidity is required for the composition of the present invention.

The polypropylene-based polymer (A) is not particularly limited in terms of stereoregularity (Tacticity), and may be any of an isotactic polypropylene resin, a syndiotactic polypropylene resin, and an atactic polypropylene resin. In applications where higher rigidity and/or heat resistance are required for the polypropylene-based resin composition of the present invention, it is desirable to use the isotactic polypropylene resin as the polypropylene-based polymer (A).

Further, the molecular structure of the polypropylene-based polymer (A) is not particularly limited, and examples thereof include a linear structure, a branched structure, and a graft structure by a modified body.

<Copolymer of Propylene with Other Monomers>

The copolymer of propylene with other monomers is not particularly limited, but from the viewpoint of the balance between high impact resistance and rigidity, preferred are random copolymers (random PP) of propylene with α-olefin comonomers, such as a propylene-ethylene random copolymer, a propylene-butene random copolymer, a propylene-ethylene-butene random copolymer, a propylene-pentene-random copolymer, a propylene-hexene random copolymer, a propylene-octene random copolymer, a propylene-ethylene-pentene random copolymer, and a propylene-ethylene-hexene random copolymer. Among these, from the viewpoint of transparency, the propylene-ethylene random copolymer is preferred when the polypropylene-based resin composition of the present invention is used for applications requiring transparency.

The content of propylene units in the polypropylene-based polymer (A) is not particularly limited, but is preferably 75 mol % or more, more preferably 80 mol % or more. When the content of the propylene units in the polypropylene-based polymer (A) is the lower limit value or more, the balance between rigidity and impact resistance of a molded article obtained by molding the polypropylene-based resin composition of the present invention tends to be good.

Further, the dispersion form of the polypropylene-based polymer (A) is not limited, and may be, for example, a form in which one type of polypropylene-based polymer exists as a continuous phase, and another polypropylene-based polymer forms a dispersed phase. Further, when the polypropylene-based polymer (A) is a mixture of two or more types of polypropylene-based polymers, for example, an isotactic polypropylene resin (homo PP) and a propylene-ethylene random copolymer (random PP) may be polymerized through different processes, and formed into separate solid pellets or the like, and then may be used.

A method of preparing the polypropylene-based polymer (A) is not particularly limited, and examples thereof include a slurry polymerization method, a gas phase polymerization method, a bulk polymerization method, and a solution polymerization method.

In the method of preparing the polypropylene-based polymer (A), various processes such as a single-step or a multi-stage may be employed.

A catalyst used for preparing the polypropylene-based polymer (A) is not particularly limited, and examples thereof include a metallocene catalyst, and a Ziegler-Natta catalyst.

The melt flow rate value (MFR) of the polypropylene-based polymer (A) is not particularly limited, but is preferably 1 to 200 g/10 min, more preferably 5 to 140 g/10 min, particularly preferably 10 to 80 g/10 min. When the melt flow rate value (MFR) of the polypropylene-based polymer (A) is the lower limit value or more, the processability tends to be good, and when it is the upper limit value or less, the rigidity tends to be good.

The content of the polypropylene-based polymer (A) in the polypropylene-based resin composition is not particularly limited, but is preferably 50 to 90% by mass, more preferably 53 to 85% by mass, yet more preferably 55 to 80% by mass, particularly preferably 57 to 75% by mass. When the content of the polypropylene-based polymer (A) is the lower limit value or more, the rigidity tends to be good, and when it is the upper limit value or less, the impact resistance and the tensile elongation at break tend to be good.

(Ethylene-α-Olefin Copolymer Rubber (B))

The ethylene-α-olefin copolymer rubber (B) is a copolymer of ethylene and α-olefin.

<<α-Olefin>>

The α-olefin constituting the ethylene-α-olefin copolymer rubber (B) is not particularly limited, and examples thereof include C3 to C20 α-olefins. The C3 to C20 α-olefins may have either a linear structure or a branched structure, and examples thereof include propylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene, and vinylnorbornene. One type of these may be used alone, or two or more types may be used. Among these, from the viewpoint of impact resistance and tensile elongation at break, C4 to C8 α-olefin comonomers are preferred, and at least one type selected from the group consisting of propylene, 1-butene, 1-hexene, 4-methyl-1-pentane, and 1-octene is more preferred. From the viewpoint of impact resistance, at least one type selected from the group consisting of propylene, 1-butene, and 1-octene is further preferred, and 1-octene is particularly preferred. Meanwhile, from the viewpoint of moldability, at least one type selected from the group consisting of propylene, 1-butene, and 1-octene is more preferred, and propylene is particularly preferred. When the α-olefin constituting the ethylene-α-olefin copolymer rubber (B) is propylene, in a preferred embodiment, preparation is performed using multi-stage polymerization during the preparation of the polypropylene-based polymer (A). More specifically, in one preferred embodiment of the present invention, in the former stage of polymerization, the isotactic polypropylene resin is polymerized, and in the latter stage, the ethylene-propylene copolymer is polymerized and then, these are mixed.

The content of the α-olefin in the ethylene-α-olefin copolymer rubber (B) is not particularly limited, but is preferably 5 to 50% by mass, more preferably 20 to 45% by mass. When the content of the α-olefin in the ethylene-α-olefin copolymer rubber (B) is the lower limit value or more, low-temperature curing resistance or flexibility tends to be good, and when it is the upper limit value or less, the rigidity tends to be good.

Two or more types of ethylene-α-olefin copolymer rubbers may be used as the ethylene-α-olefin copolymer rubber (B). In this case, from the viewpoint of further improving the impact resistance, the tensile elongation at break, and the rigidity, for example, two or more types of ethylene-α-olefin copolymer rubbers having different densities may be used in combination.

The melt flow rate value (MFR) of the ethylene-α-olefin copolymer rubber (B) is not particularly limited, but is preferably 0.1 to 50 g/10 min, more preferably 0.3 to 35 g/10 min. When the melt flow rate value (MFR) of the ethylene-α-olefin copolymer rubber (B) is the lower limit value or more, the processability tends to be good, and when it is the upper limit value or less, mechanical properties tend to be good.

The molecular weight distribution of the ethylene-α-olefin copolymer rubber (B) (Mw/Mn; Mw is the weight average molecular weight, and Mn is the number average molecular weight) is not particularly limited, but preferably, 1.3 to 5.0 is preferred.

The density of the ethylene-α-olefin copolymer rubber (B) is not particularly limited, but is preferably 0.850 to 0.910 g/cm$^3$, more preferably 0.855 to 0.885 g/cm$^3$. When the density of the ethylene-α-olefin copolymer rubber (B) is the lower limit value or more, the rigidity tends to be good, and when it is the upper limit value or less, the impact resistance and the tensile elongation at break tend to be good.

The catalyst used for preparing the ethylene-α-olefin copolymer rubber (B) is not particularly limited, and examples thereof include catalysts by which an α-olefin copolymer having a high molecular weight can be easily obtained under processing conditions (for example, catalysts based on titanium, metallocene, or vanadium). One type of these may be used alone, or two or more types may be used. Among these, from the viewpoint of structure control stability, a metallocene catalyst, titanium chloride, is preferred.

The polymerization form of the ethylene-α-olefin copolymer rubber (B) is not particularly limited, and a random copolymer of ethylene and α-olefin, a block copolymer of ethylene and α-olefin, and the like can be used. Specific examples thereof include "TAFMER (registered trademark)" manufactured by Mitsui Chemicals, which is a random copolymer rubber of ethylene and 1-butene, "ENGAGE (registered trademark)" manufactured by Dow, which is a random copolymer rubber of ethylene and 1-octene, and "INFUSE (registered trademark)" manufactured by Dow, which is a block copolymer rubber of ethylene and 1-octene, but are not limited thereto.

The content of the ethylene-α-olefin copolymer rubber (B) in the polypropylene-based resin composition is not particularly limited, but is preferably 1 to 50 parts by mass relative to 100 parts by mass of the polypropylene-based polymer (A), more preferably 10 to 50 parts by mass, further preferably 15 to 45 parts by weight, particularly preferably 15 to 35 parts by mass. When the content of the ethylene-α-olefin copolymer rubber (B) is the lower limit value or more, the impact resistance and the tensile elongation at break tend to be good, and when it is the upper limit value or less, the rigidity tends to be good.

(Hydrogenated Block Copolymer (C))

The hydrogenated block copolymer (C) is a hydrogenated product of a block copolymer having at least one polymer block (C-1) mainly composed of an aromatic vinyl compound units, and having at least one polymer block (C-2) mainly composed of a butadiene (Bd) unit and an isoprene (Ip) unit.

Hereinafter, the polymer block (C-1) and the polymer block (C-2) will be described in order.

<Polymer Block (C-1)>

The polymer block (C-1) is mainly composed of an aromatic vinyl compound-derived structural unit. "Mainly composed of" mentioned herein means that the content of the aromatic vinyl compound-derived structural unit is 50% by mass or more relative to the total mass of the polymer block (C-1). The content of the aromatic vinyl compound-derived structural unit in the polymer block (C-1) is more preferably 70% by mass or more, further preferably 90% by mass or more relative to the total mass of the polymer block (C-1) from the viewpoint of mechanical properties of the polypropylene-based resin composition.

The aromatic vinyl compound is not particularly limited, and examples thereof include styrene, o-methyl styrene, m-methyl styrene, p -methyl styrene, α-methyl styrene, 6-methyl styrene, 2,6-dimethyl styrene, 2,4-dimethyl styrene, α-methyl-o-methyl styrene, α-methyl-m-methyl styrene, α-methyl-p-methyl styrene, β-methyl-o-methyl styrene, β-methyl-m-methyl styrene, β-methyl-p-methyl styrene, 2,4,6-trimethyl styrene, αmethyl-2,6-dimethyl styrene, αmethyl-2,4-dimethyl styrene, β-methyl-2,6-dimethyl styrene, β-methyl-2,4-dimethyl styrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, β-chloro-2,6-dichlorostyrene, α-chloro-2,4-dichlorostyrene, β-chloro-2,6-dichlorostyrene, β-chloro-2,4-dichlorostyrene, o-t-butyl styrene, m-t-butyl styrene, p-t-butyl styrene, o-methoxy styrene, m-methoxy styrene, p-methoxy styrene, o-chloromethyl styrene, m-chloromethyl styrene, p-chloromethyl styrene, o-, m- or p-bromomethyl styrene, a styrene derivative substituted with a silyl group, indene, and vinyl naphthalene.

Among these, from the viewpoint of the balance of production cost and physical properties, styrene, αmethyl styrene, and a mixture thereof are preferred, and styrene is more preferred.

Meanwhile, as long as objects and effects of the present invention are not hindered, the polymer block (C-1) may contain other unsaturated monomers than the aromatic vinyl compound.

Other unsaturated monomers are not particularly limited, and examples thereof include butadiene, isoprene, 2,3-dimethyl butadiene, 1,3-pentadiene, 1,3-hexadiene, isobutylene, methyl methacrylate, methyl vinyl ether, N-vinyl carbazole, β-pinene, 8,9-p-menthene, dipentene, methylene norbornene, and 2-methylene tetrahydrofuran. When the polymer block (C-1) contains other corresponding unsaturated monomer units, the bonding form is not particularly limited, and may be any of random and tapered shapes.

The content of the aromatic vinyl compound unit in the hydrogenated block copolymer (C) is not particularly limited as long as it is less than 30% by mass, but is preferably 4 to 28% by mass, more preferably 8 to 25% by mass, particularly preferably 12 to 22% by mass from the viewpoint of obtaining particularly excellent impact resistance.

<Polymer Block (C-2)>

The polymer block (C-2) is mainly composed of structural units derived from the butadiene (Bd) unit and the isoprene (Ip) unit. "Mainly composed" mentioned herein means that the content of the butadiene (Bd)-derived structural unit and the isoprene (Ip)-derived structural unit is 50% by mass or more relative to the total mass of the polymer block (C-2). The content of the butadiene (Bd)-derived structural unit and the isoprene (Ip)-derived structural unit in the polymer block (C-2) is more preferably 70% by mass or more, further preferably 90% by mass or more relative to the total mass of the polymer block (C-2).

A conjugated diene compound constituting the polymer block (C-2) is mainly composed of the butadiene (Bd) unit and the isoprene (Ip) unit, and may further contain, for example, at least one type selected from 2,3-dimethyl butadiene, 1,3-pentadiene, and 1,3-hexadiene.

The content ratio of the butadiene (Bd) unit to the isoprene (Ip) unit (butadiene unit/isoprene unit) (molar ratio) is not particularly limited, but is preferably 10/90 to 90/10, more preferably 30/70 to 70/30, particularly preferably 40/60 to 60/40 from the viewpoint of improving performance. Further, for the polymer block (C-2), the bonding form of these is not particularly limited, and may be random, tapered, completely alternating, partially blocky, or blocky, or may take a combination of two or more types of thereof. Meanwhile, it is preferably random.

The bonding form of butadiene (Bd) and isoprene (Ip) constituting the polymer block (C-2) is not particularly limited, and can take, for example, a 1,2-bond, and a 1,4-bond in the case of butadiene, and a 1,2-bond, a 3,4-bond, and a 1,4-bond in the case of isoprene.

In the present specification, the amount of 1,2-bonds in the butadiene unit in the polymer block is referred to as the vinyl bond amount, and the total amount of the amount of 1,2-bonds and the amount of 3,4-bonds in the isoprene unit in the polymer block is referred to as the vinyl bond amount. The content of the vinyl bond amount in the entire bonding form of the polymer block is referred to as "the vinyl bond amount (%) of the polymer block", and the content of the vinyl bond amount in the entire hydrogenated block copolymer is referred to as the "degree (%) of vinylation of the hydrogenated block copolymer (C)". The amount of 1,2-bonds and the amount of 3,4-bonds can be calculated by $^{1}H$-NMR measurement as in Examples.

The vinyl bond amount in the polymer block (C-2) is not particularly limited as long as it is 20% or less, and is preferably 2 to 15%, more preferably 5 to 10%, particularly preferably 6 to 8%. When the vinyl bond amount of the polymer block (C-2) falls within the above-described range, there is a tendency to obtain more excellent impact resistance, particularly impact resistance at a low temperature.

Further, to a carbon-carbon double bond included in the polymer block (C-2) in the hydrogenated block copolymer (C), hydrogen is preferably added (hereinafter, this may be abbreviated as "hydrogenation") from the viewpoint of affinity with the polypropylene-based polymer (A) and/or the ethylene-α-olefin copolymer rubber (B). The hydrogen-addition rate (hydrogenation rate) of the polymer block (C-2) in the hydrogenated block copolymer (C) is not particularly limited, but is preferably 80 mol % or more, more preferably 85 mol % or more, particularly preferably 90 to 100 mol %. When the hydrogen-addition rate of the polymer block (C-2) in the hydrogenated block copolymer (C) falls within the above-described range, the hydrogenated block copolymer (C) exhibits good affinity with the polypropylene-based polymer (A) and the ethylene-α-olefin copolymer rubber (B), and as a result, the impact resistance of the polypropylene-based resin composition of the present invention tends to be more excellent.

In this specification, the "hydrogen-addition rate (hydrogenation rate)" is a value measured as in Examples to be described below.

Furthermore, the polymer block (C-2) may contain structural units derived from other polymerizable monomers besides the butadiene (Bd) unit and the isoprene (Ip) unit as long as the objects and effects of the present invention are not hindered. Examples of other polymerizable monomers include styrene, αmethyl styrene, o-methyl styrene, m-methyl styrene, p-methyl styrene, p-t-butyl styrene, 2,4-dimethyl styrene, vinyl naphthalene, vinyl anthracene, methyl methacrylate, methyl vinyl ether, N-vinyl carbazole, β6-pinene, 8,9-p-menthene, dipentene, methylene norbornene, and 2-methylene tetrahydrofuran.

When the polymer block (C-2) contains structural units derived from other polymer monomers besides the butadiene (Bd) unit and the isoprene (Ip) unit, the content thereof is usually 30% by mass or less, preferably 10% by mass or less, more preferably 5% by mass or less, particularly preferably 2% by mass or less relative to the total mass of the polymer block (C-2).

When the polymer block (C-2) contains structural units derived from other polymer monomers besides the butadiene (Bd) unit and the isoprene (Ip) unit, the bonding form thereof is not particularly limited, and may be any of random and tapered shapes.

<Bonding Type of Polymer Block (C-1) and Polymer Block (C-2)>

The bonding type of the hydrogenated block copolymer (C) is not particularly limited as long as the polymer block (C-1) and the polymer block (C-2) are bound, and examples thereof include linear, branched, and radial forms. One type of these may be used alone, or two or more types may be used. Among these, a linear form is preferred.

When the polymer block (C-1) is represented by A, and the polymer block (C-2) is represented by B, specific examples of the linear bonding type include a diblock copolymer represented by A-B, a triblock copolymer represented by A-B-A, a tetrablock copolymer represented by A-B-A-B, a pentablock copolymer represented by A-B-A-B-A, and a (A-B)nX-type copolymer (X represents a coupling agent residue, and n represents an integer of 3 or more). Among these, from the viewpoint of impact resistance of the polypropylene-based resin composition of the present invention, preferred is at least one type selected from the group consisting of a triblock copolymer (A-B-A), a tetrablock copolymer (A-B-A-B) and a diblock copolymer (A-B), and more preferred is a triblock copolymer (A-B-A) and/or a tetrablock copolymer (A-B-A-B).

Here, in this specification, when the same types of polymer blocks are linearly bonded via a bifunctional coupling agent or the like, all the bonded polymer blocks are treated as one polymer block. Accordingly, polymer blocks, including the above examples, as a whole, which should be originally strictly denoted by Y-X-Y (X represents a coupling residue), are represented by Y particularly unless it is necessary to distinguish those from a single polymer block Y. In this specification, since these types of polymer blocks including a coupling agent residue are treated as mentioned above, for example, a block copolymer including a coupling agent residue, which should be strictly denoted by A-B-X-B-A (X represents a coupling agent residue), is denoted by A-B-A, and is treated as an example of a triblock copolymer.

Further, in the hydrogenated block copolymer (C), within a range where the object of the present invention is not impaired, besides the polymer block (C-1) and the polymer block (C-2), a polymer block (C-3) composed of other polymerizable monomers may be present. The polymer block (C-3) is not particularly limited, but in a preferred embodiment, the polymer block (C-3) is mainly composed of structural units derived from isoprene (Ip) unit. "Mainly composed" mentioned herein means that the content of the isoprene (Ip)-derived structural unit is 50% by mass or more relative to the total mass of the polymer block (C-3). The content of the isoprene (Ip)-derived structural unit in the polymer block (C-3) is more preferably 70% by mass or more, further preferably 90% by mass or more relative to the total mass of the polymer block (C-3).

A conjugated diene compound constituting the polymer block (C-3) is mainly composed of the isoprene (Ip) unit, and may further contain, for example, at least one type selected from 2,3-dimethyl butadiene, 1,3-pentadiene, and 1,3-hexadiene.

When the content of the isoprene (Ip) unit-derived structural unit in the polymer block (C-3) is greater than 90% by mass, the vinyl bond amount is not particularly limited, but is preferably 20% or less, more preferably 2 to 15%, particularly preferably 5 to 10%. When the vinyl bond amount of the polymer block (C-3) falls within the above-described range, there is a tendency to obtain more excellent impact resistance, particularly impact resistance at a low temperature. Meanwhile, when the polymer block (C-3) contains both the butadiene (Bd) unit and the isoprene (Ip) unit, the content ratio of the butadiene (Bd) unit to the isoprene (Ip) unit (butadiene unit/isoprene unit) (molar ratio) is not particularly limited, but is preferably 10/90 to 90/10, more preferably 30/70 to 70/30, particularly preferably 40/60 to 60/40 from the viewpoint of improving performance. Further, when the polymer block (C-3) includes both the butadiene (Bd) unit and the isoprene (Ip) unit, and the molar ratio thereof is 10/90 to 90/10, the vinyl bond amount is not particularly limited, but is preferably 25% or more, more preferably 40 to 80%, further preferably 45 to 75%, particularly preferably 50 to 70%. When the vinyl bond amount falls within the above-described range, there is a tendency to obtain more excellent impact resistance, particularly impact resistance at a low temperature.

Further, as in the polymer block (C-2), to a carbon-carbon double bond included in the polymer block (C-3), hydrogen is preferably added from the viewpoint of affinity with the polypropylene-based polymer (A) and/or the ethylene-α-olefin copolymer rubber (B). The hydrogen-addition rate (hydrogenation rate) of the polymer block (C-3) in the hydrogenated block copolymer (C) is not particularly limited, but is preferably 80 mol % or more, more preferably 85 mol % or more, particularly preferably 90 to 100 mol %. When the hydrogen-addition rate of the polymer block (C-3) in the hydrogenated block copolymer (C) falls within the above-described range, the hydrogenated block copolymer (C) exhibits good affinity with the polypropylene-based polymer (A) and the ethylene-α-olefin copolymer rubber (B), and as a result, the impact resistance of the composition tends to be more excellent.

When the polymer block (C-1), the polymer block (C-2) and the polymer block (C-3) are represented by A, B, and C, respectively, examples of the structure of the block copolymer include a triblock copolymer represented by A-B-C, a tetrablock copolymer represented by A-B-C-A, and a tetrablock copolymer represented by A-B-A-C. Among these, a tetrablock copolymer represented by A-B-A-C is preferred from the viewpoint of impact resistance of the composition of the present invention. In the composition of the present invention, in particular, when the balance between the rigidity and the impact resistance at a low temperature is emphasized, as a bonding type of the hydrogenated block copolymer (C), preferred is a tetrablock copolymer represented by A-B-A-B or a tetrablock copolymer represented by A-B-A-C, that is, a tetrablock copolymer having a polymer block represented by B or C at the terminal block. When the hydrogenated block copolymer (C) has a structure of a tetrablock copolymer represented by A-B-A-B or a tetrablock copolymer represented by A-B-A-C, the ratio of the terminal block B or C in the hydrogenated block copolymer (C) is not particularly limited. From the viewpoint of obtaining the balance between more excellent rigidity and impact resistance at a low temperature, the ratio of the terminal block B or C is preferably 40% by mass or less relative to the entire hydrogenated block copolymer (C), more preferably 1 to 35% by mass, further preferably 4 to 30% by mass, particularly preferably 12 to 30% by mass.

From the viewpoint of impact resistance, as a specific example of the hydrogenated block copolymer (C), preferred is a triblock copolymer of polystyrene-hydrogenated butadiene/isoprene copolymer-polystyrene (hereinafter, which may be referred to as "SEEPS"), which is assumed to have a structure represented by the following formula (1).

(1)

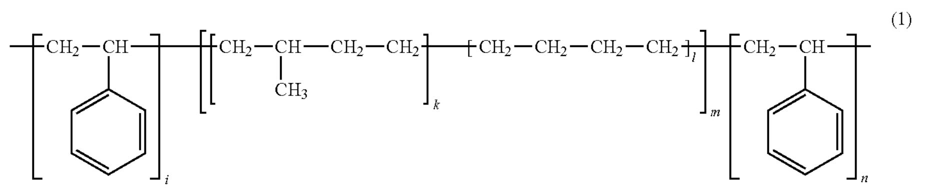

In the formula (1), each of i, k, 1, m and n represents an integer of 1 or more. In the formula (1), the order of the isoprene unit and the butadiene unit is random.

The melt flow rate value (MFR) of the hydrogenated block copolymer (C) is not particularly limited, but is preferably 0.1 to 50 g/10 min, more preferably 0.2 to 40 g/10 min, particularly preferably 0.3 to 30 g/10 min. When the melt flow rate value (MFR) of the hydrogenated block copolymer (C) is the lower limit value or more, the processability tends to be good, and when it is the upper limit value or less, mechanical properties tend to be good.

The weight average molecular weight (Mw) of the hydrogenated block copolymer (C) is not particularly limited, but is preferably 10,000 to 200,000, more preferably 20,000 to 180,000, further preferably 30,000 to 160,000, yet further preferably 50,000 to 160,000, particularly preferably 70,000 to 150,000. When the weight average molecular weight (Mw) of the hydrogenated block copolymer (C) is the lower limit value or more, the impact resistance tends to be good, and when it is the upper limit value or less, the compatibility with the polypropylene-based polymer (A) tends to be good.

The content of the hydrogenated block copolymer (C) is not particularly limited, but is preferably 1 to 50 parts by mass relative to 100 parts by mass of the polypropylene-based polymer (A), more preferably 5 to 45 parts by mass, further preferably 7 to 40 parts by mass, yet further preferably 10 to 40 parts by mass, particularly preferably 10 to 35 parts by mass. When the content of the hydrogenated block copolymer (C) is the lower limit value or more, the impact resistance tends to be good, and when it is the upper limit value or less, there is a tendency that it is possible to reduce a cost while maintaining the rigidity.

<Method of Producing Hydrogenated Block Copolymer (C)>

Examples of the production method of the hydrogenated block copolymer (C) include a solution polymerization method, an emulsification polymerization method, and a solid phase polymerization method. Among these, the solution polymerization method is preferred, and it is possible to apply known methods such as an ionic polymerization method (e.g., anionic polymerization, cationic polymerization); and a radical polymerization method. Among these, the anionic polymerization method is preferred. In the anionic polymerization method, an aromatic vinyl compound, and a mixture of butadiene (Bd) and isoprene (Ip) are sequentially added in the presence of a solvent, an anionic polymerization initiator, and if necessary a Lewis base so as to obtain a block copolymer. Then, to the block copolymer, hydrogen is added so as to obtain the hydrogenated block copolymer (C).

Examples of the organic lithium compound used as the polymerization initiator in the above-mentioned method include mono lithium compounds such as methyl lithium, ethyl lithium, pentyl lithium, n-butyl lithium, sec-butyl lithium, and tert-butyl lithium; and dilithium compounds such as tetraethylene dilithium.

The solvent is not particularly limited as long as it does not adversely affect the polymerization reaction, and examples thereof include aliphatic hydrocarbon such as cyclohexane, methyl cyclohexane, n-hexane, and n-pentane; and aromatic hydrocarbon such as benzene, toluene, and xylene. Further, the polymerization reaction is carried out generally at 0 to 100° C. for 0.5 to 50 h.

After the polymerization is carried out by the above mentioned method, an active hydrogen compound such as alcohols, carboxylic acids, or water is added to stop the polymerization reaction. Then, hydrogenation can be carried out in an inert organic solvent according to a known method in the presence of a hydrogenation catalyst to obtain a hydrogenated product. The hydrogenation reaction can be carried out in the presence of the hydrogenation catalyst, under conditions of a reaction temperature of 20 to 100° C., and a hydrogen pressure of 0.1 to 10 MPa.

Examples of the hydrogenation catalyst include Raney nickel; heterogeneous catalysts in which metals such as Pt, Pd, Ru, Rh, and Ni are carried on single substances such as carbon, alumina, and diatomaceous earth; a Ziegler-based catalyst composed of a combination of a transition metal compound, and an alkyl aluminum compound, an alkyl lithium compound or the like; and a metallocene -based catalyst.

The hydrogenated block copolymer (C) obtained in this manner can be acquired by pouring and precipitating a polymerization reaction solution in methanol, etc. and then performing heating or drying under reduced pressure, or by performing so-called steam stripping in which together with steam, the polymerization reaction solution is poured in hot water, and a solvent is azeotropically removed, and then performing heating or drying under reduced pressure.

Further, regarding the method of producing the hydrogenated block copolymer (C), production can be performed in accordance with the descriptions of, for example, JP 10-67894 A, and WO 2009/031625.

(Other Components)

Examples of other components as optional components include another polymer (D), inorganic filler (E), and other additives (F).

<Another Polymer (D)>

Another polymer (D) is a polymer other than the polypropylene-based polymer (A), the ethylene-α-olefin copolymer rubber (B), and the hydrogenated block copolymer (C). Another polymer (D) is not particularly limited, and examples thereof include polyethylenes such as low-density polyethylene (LDPE), linear low-density polyethylene (LLDPE), medium-density polyethylene (MDPE), and high-density polyethylene (HDPE); polystyrenes such as syndiotactic polystyrene; polycyclohexyl ethane; polyesters such as polyethylene terephthalate; and ethylene/styrene interpolymer. One type of these may be used alone, or two or more types may be used. Among these, polyethylenes such as medium-density polyethylene (MDPE), and high-density polyethylene (HDPE) are preferred from the viewpoint of obtaining higher rigidity while maintaining the impact resistance included in the polypropylene-based resin composition of the present invention, and in particular, high-density polyethylene (HDPE) is preferred.

In one preferred embodiment, the polypropylene-based resin composition of the present invention is also a resin composition essentially composed of only resin components, which is composed of the polypropylene-based polymer (A), the ethylene-α-olefin copolymer rubber (B), the hydrogenated block copolymer (C), and another polymer (D). In the case of this composition, since no inorganic component is contained in the resin composition, even when a molded article obtained by molding the resin composition is incinerated, a residue derived from inorganic components is not generated in an incinerator. In general, in many cases, for the use of the polypropylene-based resin composition, inorganic filler is added to balance rigidity and impact resistance. However, the resin composition of the present invention is excellent in that the balance between rigidity and impact resistance is excellent even in a case where inorganic filler is not added.

In one preferred embodiment, the polypropylene-based resin composition of the present invention is also composed of only the polypropylene-based polymer (A), the ethylene-α-olefin copolymer rubber (B), and the hydrogenated block copolymer (C). In another preferred embodiment, the polypropylene-based resin composition of the present invention further contains another polymer (D). When another polymer (D) is further contained, the content of another polymer (D) in the resin components of the polypropylene-based resin composition of the present invention is not particularly limited, but is preferably 30% by mass or less, more preferably 25% by mass or less, further preferably 20% by mass or less, particularly preferably 15% by mass or less, and is preferably 1% by mass or more, more preferably 3% by mass or more, further preferably 5% by mass or more, particularly preferably 7% by mass or more from the viewpoint of impact resistance, tensile elongation at break, and rigidity.

<Inorganic Filler (E)>

The inorganic filler (E) is not particularly limited, and examples thereof include silica, calcium carbonate, magnesium carbonate, magnesium hydroxide, aluminum hydroxide, calcium sulfate, barium sulfate, carbon black, glass fiber, glass beads, glass balloons, glass flakes, graphite, titanium oxide, potassium titanate whisker, carbon fiber, alumina, kaolin clay, silicid acid, calcium silicate, quartz, mica, talc, clay, zirconia, potassium titanate, alumina, and metal particles. One type of these may be used alone, or two or more types may be used. Among these, talc and calcium carbonate are preferred, and talc is more preferred from the viewpoint of rigidity and impact resistance.

The shape of the inorganic filler (E) is not particularly limited, and examples thereof include scaly, spherical, granular, powdery, and amorphous shapes. One type of these may be used alone, or two or more types may be used.

The polypropylene-based resin composition of the present invention can further contain the inorganic filler (E) especially when used for applications requiring rigidity. When the inorganic filler (E) is contained, the content of the inorganic filler (E) in the polypropylene-based resin composition is not particularly limited, but is preferably 5 to 30 parts by mass, more preferably 10 to 25 parts by mass, particularly preferably 15 to 23 parts by mass relative to the total of resin components in the polypropylene-based resin composition, 100 parts by mass (the total of the polypropylene-based polymer (A), the ethylene-α-olefin copolymer rubber (B), the hydrogenated block copolymer (C), and another polymer (D)). When the content of the inorganic filler (E) is the lower limit value or more, the rigidity and the impact resistance tend to be good, and when it is the upper limit value or less, the impact resistance and the tensile elongation at break tend to be good.

<Other Additives (F)>

Other additives (F) are not particularly limited, and examples thereof include a flame retardant, a stabilizer, a colorant, a pigment, an antioxidant, an antistatic agent, a dispersant, a flow enhancer, a release agent such as metal stearate, silicon oil, a mineral oil-based softening agent, a synthetic resin-based softening agent, a copper damage inhibitor, a cross-linking agent, and a nucleating agent. One type of these may be used alone, or two or more types may be used.

When other additives (F) are contained, the content of other additives (F) in the polypropylene-based resin composition is not particularly limited, but is preferably less than 20 parts by mass, more preferably less than 10 parts by mass, particularly preferably less than 5 parts by mass relative to the total of resin components in the polypropylene-based resin composition, 100 parts by mass (the total of the polypropylene-based polymer (A), the ethylene-α-olefin copolymer rubber (B), the hydrogenated block copolymer (C), and another polymer (D)).

The preparation of the polypropylene-based resin composition of the present invention can be performed by a known blending or mixing means, or a very suitable technique can be selected. It is desirable that components to be mixed are blended together through a one-step process, or a multi-step process. Further, the preparation of the polypropylene-based resin composition may be performed by dry-blending individual components, followed by melt-mixing. This may be directly performed in an extrusion molding machine for producing a molded article (for example, finished products such as automobile parts), and in a separate extrusion molding machine (for example, a Banbury mixer), pre-mixing may be performed. A dry-blended product of the polypropylene-based resin composition of the present invention may be directly subjected to injection molding without pre-melt mixing.

The mixing device is not particularly limited, and examples thereof include a Banbury mixer; a labo plastomill; and an extruder such as a single-screw extruder or a twin-screw extruder. One type of these may be used alone, or two or more types may be used. Among these, an extruder is preferred from the viewpoint of productivity and good kneadability. In order to attain more excellent performance, some of components to be mixed may be blended in different steps.

[Hydrogenated Block Copolymer (C)]

The present invention also provides a hydrogenated block copolymer (C). The hydrogenated block copolymer (C) of the present invention is a hydrogenated block copolymer (C) as a hydrogenated product of a block copolymer having a polymer block (C-1) mainly composed of an aromatic vinyl compound unit, a polymer block (C-2) mainly composed of a butadiene (Bd) unit and an isoprene (Ip) unit, and a polymer block (C-3) mainly composed of an isoprene (Ip) unit-derived structural unit (but, excluding the polymer block (C-2)), which is a tetrablock copolymer whose bonding type is represented by A-B-A-C when the polymer block (C-1), the polymer block (C-2), and the polymer block (C-3) are represented by A, B, and C, respectively.

The vinyl bond amount of the polymer block (C-2) in the hydrogenated block copolymer (C) of the present invention is not particularly limited, but is preferably 20% or less, more preferably 2 to 15%, yet further preferably 5 to 10%, particularly preferably 6 to 8%. When the vinyl bond amount of the polymer block (C-2) falls within the above-described range, there is a tendency to obtain more excellent impact resistance, in particular impact resistance at a low temperature.

The ratio of the polymer block (C-3) in the hydrogenated block copolymer (C) of the present invention is not particularly limited, but is preferably 40% by mass or less of the entire hydrogenated block copolymer (C), more preferably 1 to 35% by mass, further preferably 4 to 30% by mass, particularly preferably 12 to 30% by mass.

The content of the isoprene (Ip)-derived structural unit in the polymer block (C-3) in the hydrogenated block copolymer (C) of the present invention is not particularly limited, but is preferably 70% by mass or more based on the total mass of the polymer block (C-3), still more preferably 90% by mass or more, particularly preferably 100% by mass. Meanwhile, when the polymer block (C-3) contains both the butadiene (Bd) unit and the isoprene (Ip) unit, the content ratio of butadiene (Bd) unit to isoprene (Ip) unit (butadiene unit/isoprene unit) (molar ratio) is not particularly limited, but is preferably 10/90 to 90/10, more preferably 30/70 to 70/30, particularly preferably 40/60 to 60/40 from the viewpoint of imp roving performance.

The vinyl bond amount of the polymer block (C-3) in the hydrogenated block copolymer (C) of the present invention is not particularly limited, but is preferably 20% or less, more preferably 2 to 15%, still more preferably 5 to 10%, particularly preferably 6 to 8% when the content of the isoprene (Ip)-derived structural unit in the polymer block (C-3) is greater than 90% by mass. Further, when the polymer block (C-3) contains both the butadiene (Bd) unit and the isoprene (Ip) unit, and the molar ratio thereof is 10/90 to 90/10, the vinyl bond amount thereof is not particularly limited, but is preferably 25% or more, more preferably 40 to 80%, further preferably 45 to 75%, particularly preferably 50 to 70%. When the vinyl bond amount falls within the above-described range, there is a tendency to obtain more excellent impact resistance, in particular, impact resistance at a low temperature.

The hydrogen-addition rate (hydrogenation rate) of the polymer block (C-3) in the hydrogenated block copolymer (C) of the present invention is not particularly limited, but is preferably 80 mol % or more, more preferably 85 mol % or more, particularly preferably 90 to 100 mol %.

The weight average molecular weight (Mw) of the hydrogenated block copolymer (C) of the present invention is not particularly limited, but the weight average molecular weight (Mw) of the hydrogenated block copolymer (C) is not particularly limited, but is preferably 10,000 to 200,000, more preferably 20,000 to 180,000, further preferably 30,000 to 160,000, yet further preferably 50,000 to 160,000, particularly preferably 70,000 to 150,000.

The molecular weight distribution (Mw/Mn) of the hydrogenated block copolymer (C) of the present invention is not particularly limited, but is preferably 1.50 or less, more preferably 1.30 or less, particularly preferably 1.10 or less.

The content of the aromatic vinyl compound unit in the hydrogenated block copolymer (C) of the present invention is not particularly limited as long as it is less than 30% by mass, but is preferably 4 to 28% by mass, more preferably 8 to 25% by mass, particularly preferably 12 to 22% by mass from the viewpoint of obtaining particularly excellent impact resistance.

The weight average molecular weight (Mw) of the polymer block (C-1) in the hydrogenated block copolymer (C) of the present invention is not particularly limited, but is preferably 1,000 to 20,000, more preferably 2,000 to 10,000, yet further preferably 3,000 to 9,000, particularly preferably 4,000 to 8,000.

As a specific example of the hydrogenated block copolymer (C) of the present invention, from the viewpoint of impact resistance, preferred is a tetrablock copolymer of polystyrene-hydrogenated butadiene/isoprene copolymer-polystyrene-hydrogenated polyisoprene, which is assumed to be a structure represented by the following formula (2). Further, in another preferred embodiment, a tetrablock copolymer of polystyrene-hydrogenated butadiene/isoprene copolymer 1-polystyrene-hydrogenated butadiene/isoprene copolymer 2 may be exemplified. In this case, in the block of hydrogenated butadiene/isoprene copolymer 1 and the block of hydrogenated butadiene/isoprene copolymer 2, vinyl bond amounts may be the same or different.

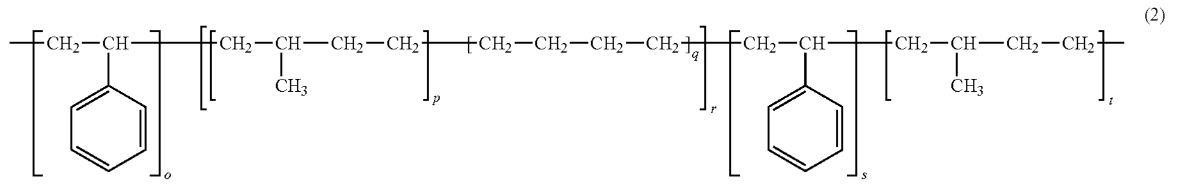

(2)

In the formula (2), each of o, p, q, r, s and t represents an integer of 1 or more. In the formula (2), the order of the isoprene unit and the butadiene unit is random.

[Molded Article, Interior-Exterior Decorative Material for Automobiles]

The present invention also provides a molded article containing at least the polypropylene-based resin composition of the present invention.

The molded article of the present invention may be obtained through, for example, molding by softening or melting the polypropylene-based resin composition of the present invention, with heat.

The molding technique is not particularly limited, and examples thereof include compression molding, injection molding, gas-assisted injection molding, hollow molding, sheet molding, rotational molding, laminate molding, calendering, vacuum molding, thermal molding, heat-molding, and extrusion. One type of these may be used alone, or two or more types may be used. Among these, from the viewpoint of productivity, injection molding is preferable.

An application of the molded article of the present invention is not particularly limited, and examples thereof include interior-exterior decorative materials for automobiles such as bumper beams, bumper plates, pillars, and instrument panels; housings and covers of electrical equipment; freezer containers; garden furniture; and building and architectural sheets. One type of these may be used alone, or two or more types may be used. Among these, from the viewpoint of impact resistance, interior-exterior decorative materials for automobiles are preferable.

EXAMPLE

Hereinafter, the present invention will be described in detail with reference to Examples and Comparative Examples, but the present invention is not limited to these at all.

Evaluations were performed, in accordance with the following evaluation methods, on the melt flow rate (MFR) of composition components (a polypropylene-based polymer (A), an ethylene-α-olefin copolymer rubber (B), and a hydrogenated block copolymer (C)) used for preparing a composition in each example, and a polypropylene-based resin composition obtained in each example; the content (styrene content) of aromatic vinyl compound units in each of hydrogenated block copolymers 1 to 7 (SEEPS, SEBS, SEP, SEEPSEP, and SEEPSEEP) produced in Production Examples; the "vinyl bond amount of a polymer block (C-2)" in the hydrogenated block copolymer (C), for each of the hydrogenated block copolymers 1 to 7 (SEEPS, SEBS, SEP, SEEPSEP, and SEEPSEEP) produced in Production Examples, and the "vinyl bond amount of a polymer block (C-3)" in the hydrogenated block copolymers 6 and 7 produced in Production Examples 6 and 7; the hydrogen-addition rate in the polymer block (C-2) (and (C-3)) of the hydrogenated block copolymer (C), for each of the hydrogenated block copolymers 1 to 7 (SEEPS, SEBS, SEP, SEEPSEP, and SEEPSEEP) produced in Production Examples; the impact resistance (Charpy impact strength) of a molded article obtained in each example; and the bending strength and the flexural modulus.

(1. Evaluation Method of Melt Flow Rate (MFR))

The melt flow rate (MFR) was evaluated (unit: g/10 min, 230° C., 2.16 kgf) in accordance with IS01133:1997 on composition components (a polypropylene- based polymer (A), an ethylene-α-olefin copolymer rubber (B), and a hydrogenated block copolymer (C)) used for preparing a composition in each example, and a polypropylene-based resin composition obtained in each example.

(2. Evaluation Method of Content (Styrene Content) of Aromatic Vinyl Compound Units in Hydrogenated Block Copolymer (C))

Each of hydrogenated block copolymers 1 to 7 (SEEPS, SEBS, SEP, SEEPSEP, and SEEPSEEP) produced in Production Examples was dissolved in $CDC_3$, and $^1$-NMR measurement [device: "ADVANCE 400 Nano bay" (manufactured by Bruker), measurement temperature: 30° C.] was performed. From the obtained spectrum, the content (styrene content) of aromatic vinyl compound units in the hydrogenated block copolymer was calculated.

(3. Evaluation Method of "Vinyl Bond Amount of Polymer Block (C-2) or (C-3)" and "Degree of Vinylation of Hydrogenated Block Copolymer (C)", in Hydrogenated Block Copolymer (C))

An unhydrogenated block copolymer (C) was dissolved in $CDCl_3$ and $^1$H-NMR measurement [device: "ADVANCE 400 Nano bay" (manufactured by Bruker), measurement temperature: 30° C.] was performed. A vinyl bond amount (the total content of 3,4-bond units and 1,2-bond units) was calculated from a ratio of peak areas corresponding to 3,4-bond units and 1,2-bond units in isoprene structural units and 1,2-bond units in butadiene structural units relative to a total peak area of isoprene and/or butadiene-derived structural units. When the hydrogenated block copolymer (C) is a triblock copolymer composed of polymer block (C-1)-polymer block (C-2)-polymer block (C-1), the vinyl bond amount of the polymer block (C-2) was set as the degree of vinylation of the hydrogenated block copolymer (C). Meanwhile, when the hydrogenated block copolymer (C) is a tetrablock copolymer composed of polymer block (C-1)-polymer block (C-2)-polymer block (C-1)-polymer block (C-3), a part of a polymerization solution was sampled at a stage of polymerization up to a triblock copolymer composed of polymer block (C-1)-polymer block (C-2)-polymer block (C-1), and then the vinyl bond amount of the polymer block (C-2) was measured by using the above-described technique. Then, the tetrablock copolymer composed of polymer block (C-1)-polymer block (C-2)-polymer block (C-1)-polymer block (C-3) was polymerized, and then the degree of vinylation of the entire polymer was measured by the above-described technique. As a result, the vinyl bond amount of the polymer block (C-3) was calculated from the obtained vinyl bond amount of the polymer block (C-2), the degree of vinylation of the entire polymer, and the content of each of the polymer block (C-2) and the polymer block (C-3).

(4. Evaluation Method of Hydrogen-Addition Rate in Polymer Block (C-2) (and (C-3)) of Hydrogenated Block Copolymer (C))

The hydrogenated block copolymer was dissolved in $CDCl_3$, and $^1$H-NMR measurement [device: "ADVANCE 400 Nano bay" (manufactured by Bruker), measurement temperature: 30° C.] was carried out, so that a hydrogen-addition rate was calculated from a ratio of the peak area derived from residual olefin of isoprene or butadiene, to the peak area derived from ethylene, propylene and butylene.

(5. Evaluation Method of Weight Average Molecular Weight of Hydrogenated Block Copolymer (C))

This was obtained through measurement using GPC measurement under the following conditions.

<GPC Measurement Device and Measurement Conditions>

Device: GPC device "HLC-8020" (manufactured by Tosoh Corporation)

Separation column: two "TSKgel G4000 HX" manufactured by Tosoh Corporation were connected in series.

Eluent: tetrahydrofuran

Eluent flow rate: 0.7 mL/min

Sample concentration: 5 mg/10 mL

Column temperature: 40° C.

Detector differential refractive index (RI) detector

Calibration curve: created using standard polystyrene (6. Evaluation Method of Impact Resistance (Charpy Impact Strength))

The impact resistance (Charpy impact strength) was evaluated in accordance with ISO179 on the molded article of the polypropylene-based resin composition obtained in each example (attached with Notch: Type A Charpy (Test Methods E23) specimens, Hammer capacity: 7.5 J, number of samples: n=5, measurement temperature: +21° C., 0° C., -20° C., and −40° C.).

(7. Evaluation Method of Specified Bending Strength (Strain 3.5%) and Flexural Modulus (Strain 0.05-0.25%))

By using the polypropylene-based resin composition obtained in each example, a JIS multi-purpose test piece Al was produced through injection molding by an injection molding machine ("EC75SX", manufactured by Toshiba Machine Co., Ltd.). By using the central portion thereof (length 80 mm×width 10 mm×thickness 4 mm), in accordance with JIS K7171 (ISO 178), a bending strength test was carried out using a universal testing machine (manufactured by Instron, 5566 type). Then, a specified bending strength [MPa] (strain 3.5%) and a flexural modulus [MPa] (strain 0.05-0.25%) were measured.

Production Example 1

In a nitrogen-purged and dried pressure-resistant container with a stirrer, 50 kg of cyclohexane dried with molecular sieves A4, and 190 g of cyclohexane solution of sec-butyl lithium with a concentration of 10% by mass as an anionic polymerization initiator (substantial addition amount of sec-butyl lithium: 19 g) were charged. After the temperature inside the pressure-resistant container was raised to 50° C., 2000 g of sufficiently dehydrated styrene (1) was added, followed by polymerization at 50° C. for 60 min. Then, a previously prepared mixture of 8400 g of isoprene and 5600 g of butadiene was added, followed by polymerization at 50° C. for 60 min, and 2000 g of styrene (2) was further added, followed by polymerization at 50° C. for 60 min. Then, methanol was added to stop the reaction, and a styrene-isoprene/butadiene-styrene-type block copolymer (hereinafter abbreviated as a block copolymer 1) was prepared as a cyclohexane solution. The temperature of this reaction solution was raised to 50° C., and then the pressure was increased up to a hydrogen pressure of 1 MPa. Next, a Ziegler-based catalyst (hydrogenation catalyst) formed of nickel octylate and trimethyl aluminum was added thereto under a hydrogen atmosphere. While the temperature was raised to 80° C. by the reaction heat, the reaction was performed until absorption of hydrogen disappeared, such that a hydrogenation reaction of a polymer block (C-2) was performed. This reaction solution was allowed to be cooled and the pressure was released, and then the Ziegler-based catalyst was removed by washing with water. Through vacuum-drying, a hydrogenated product of a triblock copolymer of polystyrene-poly(isoprene/butadiene)-polystyrene (hereinafter, abbreviated as a hydrogenated block copolymer 1) was obtained. The obtained hydrogenated block copolymer 1 was a triblock copolymer (SEEPS) of polystyrene-hydrogenated butadiene/isoprene copolymer-polystyrene, the styrene content was 20% by mass, "the vinyl bond amount of the polymer block (C-2)" (that is, the degree of vinylation of the hydrogenated block copolymer 1) was 6.3%, the weight average molecular weight was 98,000, the hydrogen-addition rate in the polymer block (C-2) was 98.7%, and the melt flow rate (MFR) was 1.0 g/10 min (230° C., 2.16 kgf).

Production Example 2

In a nitrogen-purged and dried pressure-resistant container with a stirrer, 50 kg of cyclohexane dried with molecular sieves A4, and 70 g of cyclohexane solution of sec-butyl lithium with a concentration of 10% by mass as an anionic polymerization initiator (substantial addition amount of sec-butyl lithium: 7 g) were charged. After the temperature inside the pressure-resistant container was raised to 50° C., 3000 g of sufficiently dehydrated styrene (1) was added, followed by polymerization at 50° C. for 60 min. Then, a previously prepared mixture of 8400 g of isoprene and 5600 g of butadiene was added, followed by polymerization at 50° C. for 60 min, and 3000 g of styrene (2) was further added, followed by polymerization at 50 ° C. for 60 min. Then, methanol was added to stop the reaction, and a styrene-isoprene/butadiene-styrene-type block copolymer (hereinafter, abbreviated as a block copolymer 2) was prepared as a cyclohexane solution. The obtained cyclohexane solution of the block copolymer 2 was subjected to a hydrogenation reaction under the same conditions as those described in Production Example 1 so as to obtain a hydrogenated product of a triblock copolymer of polystyrene-poly (isoprene/butadiene)-polystyrene (hereinafter, abbreviated as a hydrogenated block copolymer 2). The obtained hydrogenated block copolymer 2 was a triblock copolymer (SEEPS) of polystyrene-hydrogenated butadiene/isoprene copolymer-polystyrene, the styrene content was 30% by mass, the "vinyl bond amount of the polymer block (C-2)" (that is, "the degree of vinylation of the hydrogenated block copolymer 2") was 6.3%, the weight average molecular weight was 270,000, and the hydrogen-addition rate in the polymer block (C-2) was 98.7%. Further, although measurement of the melt flow rate (MFR) was carried out, nothing flowed under conditions of "230° C. and 2.16 kgf".

Production Example 3

In a nitrogen-purged and dried pressure-resistant container with a stirrer, 50 kg of cyclohexane dried with molecular sieves A4, and 70 g of cyclohexane solution of sec-butyl lithium with a concentration of 10% by mass as an anionic polymerization initiator (substantial addition amount of sec-butyl lithium: 7 g) were charged. After the temperature inside the pressure-resistant container was raised to 50° C., 3400 g of sufficiently dehydrated styrene (1) was added, followed by polymerization at 50° C. for 60 min. Then, 90 g of tetrahydrofuran was added, and then, 14000 g of butadiene was added, followed by polymerization at 60° C. for 60 min, and 3400 g of styrene (2) was further added, followed by polymerization at 50° C. for 60 min. then, methanol was added to stop the reaction, and a styrene-butadiene-styrene-type block copolymer (hereinafter, abbreviated as a block copolymer 3) was prepared as a cyclohexane solution. The obtained cyclohexane solution of the block copolymer 3 was subjected to a hydrogenation reaction under the same conditions as those described in Production Example 1 so as to obtain a hydrogenated product of a triblock copolymer of polystyrene-polybutadiene-polystyrene (hereinafter, abbreviated as a hydrogenated block copolymer 3). The obtained hydrogenated block copolymer 3 was a triblock copolymer (SEBS) of polystyrene-hydrogenated polybutadiene-polystyrene, the styrene content was 33% by mass, the "vinyl bond amount of the polymer block (C-2)" (that is, "the degree of vinylation of the hydrogenated block copolymer 3") was 38.3%, the weight average molecular weight was 290,000, and the hydrogen-addition rate in the polymer block (C-2) was 99.5%. Further, although measurement of the melt flow rate (MFR) was carried out, nothing flowed under conditions of "230° C., and 2.16 kgf".

Production Example 4

A hydrogenated product of a triblock copolymer of polystyrene-poly(isoprene/butadiene)-polystyrene (hereinafter, abbreviated as a hydrogenated block copolymer 4) was obtained in accordance with the method described in Production Example 2 except that as an anionic polymerization initiator, "220 g of cyclohexane solution of sec-butyl lithium with a concentration of 10% by mass (substantial addition amount of sec-butyl lithium: 22 g)" was used instead of "70 g of cyclohexane solution of sec-butyl lithium with a concentration of 10% by mass (substantial addition amount of sec-butyl lithium: 7 g)". The obtained hydrogenated block copolymer 4 was a triblock copolymer (SEEPS) of polystyrene-hydrogenated butadiene/isoprene copolymer-polystyrene, the styrene content was 30% by mass, the weight average molecular weight was 90,000, the hydrogen-addition rate in the polymer block (C-2) was 98.2%, and the melt flow rate (MFR) was less than 0.1 g/10 min (230° C., 2.16 kgf).

Production Example 5

In a nitrogen-purged and dried pressure-resistant container with a stirrer, 50 kg of cyclohexane dried with molecular sieves A4, and 160 g of cyclohexane solution of sec-butyl lithium with a concentration of 10% by mass as an anionic polymerization initiator (substantial addition amount of sec-butyl lithium: 16 g) were charged. After the temperature inside the pressure-resistant container was raised to 50° C., 8000 g of sufficiently dehydrated styrene was added, followed by polymerization at 50° C. for 60 min. Then, 14000 g of isoprene was added, followed by polymerization at 60° C. for 60 min. Then, methanol was added to stop the reaction, and a styrene-isoprene-type block copolymer (hereinafter, abbreviated as a block copolymer 5) was prepared as a cyclohexane solution. The obtained cyclohexane solution of the block copolymer 5 was subjected to a hydrogenation reaction under the same conditions as those described in Production Example 1 so as to obtain a hydrogenated product of a diblock copolymer of polystyrene-polyisoprene (hereinafter, abbreviated as a hydrogenated block copolymer 5). The obtained hydrogenated block copolymer 5 was a diblock copolymer (SEP) of polystyrene-hydrogenated polyisoprene, the styrene content was 36% by mass, the weight average molecular weight was 90,000, and the hydrogen-addition rate in the polymer block (C-2) was 98.2%. Further, although measurement of the melt flow rate (MFR) was carried out, nothing flowed under conditions of "230° C. and 2.16 kgf".

Production Example 6

In a nitrogen-purged and dried pressure-resistant container with a stirrer, 50 kg of cyclohexane dried with molecular sieves A4, and 130 g of cyclohexane solution of sec-butyl lithium with a concentration of 10% by mass as an anionic polymerization initiator (substantial addition amount of sec-butyl lithium: 13 g) were charged. After the temperature inside the pressure-resistant container was raised to 50° C., 1100 g of sufficiently dehydrated styrene (1) was added, followed by polymerization at 50° C. for 60 min. Then, a previously prepared mixture of 5000 g of isoprene and 3950 g of butadiene was added, followed by polymerization at 50° C. for 60 min, 1100 g of styrene (2) was further added, followed by polymerization at 50° C. for 60 min, and then 1250 g of isoprene was further added, followed by polymerization at 50° C. for 60 min. Then, methanol was added to stop the reaction, and a styrene-isoprene/butadiene-styrene-isoprene-type block copolymer (hereinafter, abbreviated as a block copolymer 6) was prepared as a cyclohexane solution. The temperature of this reaction solution was raised to 50° C., and then the pressure was increased up to a hydrogen pressure of 1 MPa. Next, a Ziegler-based catalyst (hydrogenation catalyst) formed of nickel octylate and trimethyl aluminum was added thereto under a hydrogen atmosphere. While the temperature was raised to 80° C. by the reaction heat, the reaction was performed until absorption of hydrogen disappeared, so that a hydrogenation reaction of polymer blocks (C-2) and (C-3) was performed. This reaction solution was allowed to be cooled and the pressure was released, and then the Ziegler-based catalyst was removed by washing with water. Through vacuum-drying, a hydrogenated product of a tetrablock copolymer of polystyrene-poly(isoprene/butadiene)-polystyrene-polyisoprene (hereinafter, abbreviated as a hydrogenated block copolymer 6) was obtained. The obtained hydrogenated block copolymer 6 was a tetrablock copolymer (SEEPSEP) of polystyrene-hydrogenated butadiene/isoprene copolymer-polystyrene-hydrogenated isoprene, the styrene content was 18% by mass, "the vinyl bond amount of the polymer block (C-2)" was 6.1%, and the "degree of vinylation of the hydrogenated block copolymer 6" was 6.3%. The ratio of the polymer block (C-3) in the hydrogenated block copolymer 6 was 10% by mass, and the calculated "vinyl bond amount of the polymer block (C-3)" was 6.6%. Further, the content of isoprene (Ip)-derived structural unit in the polymer block (C-3) was 100% by mass. Furthermore, the weight average molecular weight of the hydrogenated block copolymer 6 was 132,000, the hydrogen-addition rate in the polymer blocks (C-2) and (C-3) was 99.2%, and the melt flow rate (MFR) was 0.7 g/10 min (230° C., 2.16 kgf).

Production Example 7

In a nitrogen-purged and dried pressure-resistant container with a stirrer, 50 kg of cyclohexane dried with molecular sieves A4, and 135 g of cyclohexane solution of sec-butyl lithium with a concentration of 10% by mass as an anionic polymerization initiator (substantial addition amount of sec-butyl lithium: 13.5 g) were charged. After the temperature inside the pressure-resistant container was raised to 50° C., 1100 g of sufficiently dehydrated styrene (1) was added, followed by polymerization at 50° C. for 60 min. Then, a previously prepared mixture of 4150 g of isoprene and 3400 g of butadiene was added, followed by polymerization at 50° C. for 60 min, 1100 g of styrene (2) was further added, followed by polymerization at 50° C. for 60 min, and then a previously prepared mixture of 1350 g of isoprene and 1100 g of butadiene and 300 g of tetrahydrofuran were further added, followed by polymerization at 50° C. for 60 min. Then, methanol was added to stop the reaction, and a styrene-isoprene/butadiene-styrene-isoprene-type block copolymer (hereinafter, abbreviated as a block copolymer 6) was prepared as a cyclohexane solution. The temperature of this reaction solution was raised to 50° C., and then the pressure was increased up to a hydrogen pressure of 1 MPa. Next, a Ziegler-based catalyst (hydrogenation catalyst) formed of nickel octylate and trimethyl aluminum was added thereto under a hydrogen atmosphere. While the temperature was raised to 80° C. by the reaction heat, the reaction was performed until absorption of hydrogen disappeared, so that a hydrogenation reaction of polymer blocks (C-2) and (C-3) was performed. This reaction solution was allowed to be cooled and the pressure was released, and then the Ziegler-based catalyst was removed by washing with water. Through vacuum-drying, a hydrogenated product of a tetrablock copolymer of polystyrene-poly(isoprene/butadiene)-polystyrene-poly(isoprene/butadiene) (hereinafter, abbreviated as a hydrogenated block copolymer 7) was obtained. The obtained hydrogenated block copolymer 7 was a tetrablock copolymer (SEEPSEEP) of polystyrene-hydrogenated butadiene/isoprene copolymer-polystyrene-hydrogenated poly(isoprene/butadiene), the styrene content was 18% by mass, "the vinyl bond amount of the polymer block (C-2)" was 6.5%, and the "degree of vinylation of the hydrogenated block copolymer 7" was 20.7%. The ratio of the polymer block (C-3) in the hydrogenated block copolymer 7 was 20% by mass, and the calculated "vinyl bond amount of the polymer blocks (C-3)" was 60.2%. Further, the content of butadiene (Bd)-derived structural unit in the polymer block (C-3) was 44% by mass, and the content of isoprene (p)-derived structural units in the polymer block (C-3) was 56% by mass. Furthermore, the weight average molecular weight of the hydrogenated block copolymer 7 was 120,000, the hydrogen-addition rate in the polymer blocks (C-2) and (C-3) was 98.2%, and the melt flow rate (MFR) was 2.5 g/10 min (230° C., 2.16 kgf).

Example 1 and Comparative Examples 1 to 6

Individual components were kneaded at a ratio noted in Table 1 below with a twin-screw extruder (L/D=56, 26 mm Φ), at 180° C., 350 rpm, and an extrusion rate of 5 kg/h to prepare a polypropylene-based resin composition. Then, through molding at an injection molding temperature of 220° C., and a mold temperature of 40° C., a molded article of the polypropylene-based resin composition was produced. The melt flow rate (MFR) of the obtained polypropylene-based resin composition was evaluated, the impact resistance (Charpy impact strength) of the obtained molded article of the polypropylene-based resin composition was evaluated, and the flexural modulus (strain 0.05-0.25%) of the obtained molded article of the polypropylene-based resin composition was evaluated.

The results are noted in Table 1.

Hydrogenated block copolymer (C): a triblock copolymer of polystyrene-hydrogenated butadiene/isoprene copolymer-polystyrene (SEEPS): a hydrogenated block copolymer 4 obtained in Production Example 4 (styrene content 30% by mass)

Hydrogenated block copolymer (C): a diblock copolymer of polystyrene-hydrogenated polyisoprene (SEP): a hydrogenated block copolymer 5 obtained in Production Example 5 (styrene content 36% by mass)

TABLE 1

| | | | Unit | Example 1 | Comparative Example 1 | Comparative Example 2 | Comparative Example 3 | Comparative Example 4 | Comparative Example 5 | Comparative Example 6 |
|---|---|---|---|---|---|---|---|---|---|---|
| Blending | Polypropylene-based polymer (A) | PP | Part by mass | 100 | 100 | 100 | 100 | 100 | 100 | 100 |
| | Ethylene-α-olefin copolymer rubber (B) | EOR | | 25 | 25 | 56 | 25 | 25 | 25 | 25 |
| | Hydrogenated block copolymer (C) | Hydrogenated block copolymer 1 SEEPS styrene content 20% by mass | | 31 | 0 | 0 | 0 | 0 | 0 | 0 |
| | | Hydrogenated block copolymer 2 SEEPS styrene content 30% by mass | | 0 | 0 | 0 | 31 | 0 | 0 | 0 |
| | | Hydrogenated block copolymer 3 SEBS styrene content 33% by mass | | 0 | 0 | 0 | 0 | 31 | 0 | 0 |
| | | Hydrogenated block copolymer 4 SEEPS styrene content 30% by mass | | 0 | 0 | 0 | 0 | 0 | 31 | 0 |
| | | Hydrogenated block copolymer 5 SEP styrene content 36% by mass | | 0 | 0 | 0 | 0 | 0 | 0 | 31 |
| Evaluation result | MFR of polypropylene-based resin composition | | g/10 min | 10.4 | 15.3 | 16.4 | 4.7 | 5.8 | 7.6 | 9.1 |
| | Charpy impact strength of molded article | RT | kJ/m$^2$ | 62.79 | 4.21 | 17.63 | 14.29 | 13.55 | 7.58 | 49.03 |
| | | 0° C. | | 16.27 | 1.83 | 5.05 | 7.20 | 7.24 | 4.78 | 10.29 |
| | | −20° C. | | 7.56 | 1.45 | 3.17 | 5.50 | 5.85 | 4.34 | 6.60 |
| | | −40° C. | | 6.20 | 1.92 | 2.86 | 4.75 | 3.78 | 3.36 | 4.62 |
| | Flexural modulus | | MPa | 881 | 973 | 751 | 628 | 656 | 708 | 738 |

(Description on Each Component in Table 1)

Polypropylene-based polymer (A): PP: homopolypropylene: product name "P4C5Z-27", manufactured by Flint Hills Resources: melt flow rate (MFR) of 20 g/10 min (230° C., 2.16 kgf)

Ethylene-α-olefin copolymer rubber (B): EOR: ethylene/1 -octene random copolymer: product name "ENGAGE (registered trademark) 8200", manufactured by Dow: melt flow rate (MFR) of 5 g/10 min (230° C., 2.16 kgf), density of 0.87 g/cm$^3$ Hydrogenated block copolymer (C): a triblock copolymer of polystyrene-hydrogenated butadiene/isoprene copolymer-polystyrene (SEEPS): a hydrogenated block copolymer 1 obtained in Production Example 1 (styrene content 20% by mass)

Hydrogenated block copolymer (C): a triblock copolymer of polystyrene-hydrogenated butadiene/isoprene copolymer-polystyrene (SEEPS): a hydrogenated block copolymer 2 obtained in Production Example 2 (styrene content 30% by mass)

Hydrogenated block copolymer (C): a triblock copolymer of polystyrene-hydrogenated poly butadiene-polystyrene (SEBS): a hydrogenated block copolymer 3 obtained in Production Example 3 (styrene content 33% by mass)

From Table 1, the molded article produced in Example 1 was excellent in impact resistance, in particular, impact resistance at a low temperature (−20° C. and −40° C.).

Meanwhile, the molded articles produced in Comparative Examples 1 to 6 were not good in impact resistance, in particular, impact resistance at a low temperature (−20° C. and −40° C.).

The effect of the present invention can be expected for molded articles, which are produced by producing hydrogenated block copolymers (C) having styrene contents of 4% by mass, 15% by mass, and 25% by mass, respectively, in the same manner as in Production Example 1, and then by preparing polypropylene-based resin compositions in the same manner as in Example 1.

The effect of the present invention can be expected for a molded article in which the content of the hydrogenated block copolymer (C) is 5 parts by mass, 10 parts by mass, or 45 parts by mass relative to 100 parts by mass of the polypropylene-based polymer (A), among molded articles, which are produced by producing hydrogenated block copolymers (C) in the same manner as in Production Example 1, and then by preparing polypropylene-based resin compositions in the same manner as in Example 1.

Examples 2 to 10 and Comparative Example 7

Individual components were kneaded at a ratio noted in Table 2 below with a twin-screw extruder (L/D=56, 26 mmΦ), at 180° C., 350 rpm, and an extrusion rate of 5 kg/h to prepare a polypropylene-based resin composition. Then, through molding at an injection molding temperature of 220° C., and a mold temperature of 40° C., a molded article of the polypropylene-based resin composition was produced. The melt flow rate (MFR) of the obtained polypropylene-based resin composition was evaluated, the impact resistance (Charpy impact strength) of the obtained molded article of the polypropylene-based resin composition was evaluated, and the flexural modulus (strain 0.05-0.25%) and the specified bending strength (strain 3.5%) of the obtained molded article of the polypropylene-based resin composition were evaluated. The results are noted in Table 2.

amount of polymer block (C-2)" (i.e., "degree of vinylation of hydrogenated block copolymer (C)") of 6.3%, hydrogen-addition rate of polymer block (C-2) of 98.7%)

Hydrogenated block copolymer (C): a tetrablock copolymer of polystyrene-hydrogenated butadiene/isoprene copolymer-polystyrene-polyisoprene: a hydrogenated block copolymer 6 obtained in Production Example 6

Hydrogenated block copolymer (C): a tetrablock copolymer of polystyrene-hydrogenated butadiene/isoprene copolymer-polystyrene-hydrogenated butadiene/isoprene copolymer: a hydrogenated block copolymer 7 obtained in Production Example 7

Ethylene-α-olefin copolymer rubber (B): EOR: ethylene/1-octene random copolymer: product name "ENGAGE (registered trademark) 8200", manufactured by Dow: melt flow rate (MFR) of 5 g/10 min (230° C., 2.16 kgf),

TABLE 2

| | | Comparative Example 7 | Example 2 | Example 3 | Example 4 | Example 5 | Example 6 | Example 7 | Example 8 | Example 9 | Example 10 |
|---|---|---|---|---|---|---|---|---|---|---|---|
| Polypropylene-based polymer (A) | hPP J106G | 0 | 100 | 100 | 0 | 0 | 0 | 0 | 100 | 0 | 0 |
| Polypropylene-based polymer (A) + ethylene-α-olefin copolymer rubber (B) | bPP J750H | 100 | 0 | 0 | 142 | 142 | 142 | 142 | 0 | 142 | 142 |
| Hydrogenated block copolymer (C) | Hydrogenated block copolymer 1 SEEPS | 0 | 31 | 0 | 16 | 0 | 30 | 0 | 0 | 0 | 0 |
| | Hydrogenated block copolymer 6 Tetrablock copolymer | 0 | 0 | 31 | 0 | 16 | 0 | 30 | 0 | 0 | 0 |
| | Hydrogenated block copolymer 7 Tetrablock copolymer | 0 | 0 | 0 | 0 | 0 | 0 | 0 | 31 | 16 | 30 |
| Ethylene-α-olefin copolymer rubber (B) | EOR Engage 8200 | 0 | 25 | 25 | 0 | 0 | 0 | 0 | 25 | 0 | 0 |
| Highdensity polyethylene | HDPE SHE150 | 0 | 0 | 0 | 0 | 0 | 30 | 30 | 0 | 0 | 30 |
| Antioxidant | AO-60 | 0 | 0.1 | 0.1 | 0.1 | 0.1 | 0.1 | 0.1 | 0.1 | 0.1 | 0.1 |
| Charpy impact strength of molded article [kJ/m$^2$] | RT | 11.83 | 62.79 | 51.07 | 25.36 | 52.95 | 63.43 | 64.76 | 61.56 | 27.20 | 66.04 |
| | 0° C. | 8.35 | 16.27 | 22.15 | 14.68 | 18.33 | 67.94 | 70.11 | 60.69 | 16.20 | 69.01 |
| | −20° C. | 6.45 | 7.56 | 11.25 | 11.67 | 14.15 | 66.50 | 69.76 | 46.07 | 12.05 | 67.83 |
| | −40° C. | 5.33 | 6.20 | 8.78 | 8.95 | 10.80 | 19.72 | 24.05 | 11.19 | 8.79 | 31.52 |
| Flexural modulus (strain 0.05-0.25%) [MPa] | RT | 1236 | 860 | 860 | 1118 | 1074 | 860 | 826 | 853 | 1070 | 829 |
| Specified bending strength (strain 3.5%) [MPa] | RT | 29 | 20 | 21 | 25 | 25 | 19 | 18 | 20 | 25 | 19 |
| MFR (230° C., 2.16 kg) [g/10 min] | | — | 10.4 | 9.3 | 9.6 | 8.7 | 6.5 | 6.2 | 11.6 | 10.2 | 6.9 |

(Description on Each Component in Table 2)

Polypropylene-based polymer (A): hPP: homopolypropylene: product name "Prime Polypro J106G", manufactured by Prime Polymer: melt flow rate (MFR) of 15 g/10 min (230° C., 2.16 kgf)

Polypropylene-based polymer (A) +ethylene-α-olefin copolymer rubber (B): block-PP: mixture of homopolypropylene and ethylene propylene rubber (EPR) (mass ratio 70.6:29.4): product name "Prime Polypro J750HP" manufactured by Prime Polymer: melt flow rate (MFR) of 14 g/10 min (230° C., 2.16 kgf), ethylene content of 14.7% by mass Hydrogenated block copolymer (C): a triblock copolymer of polystyrene- hydrogenated butadiene/isoprene copolymer-polystyrene (SEEPS): a hydrogenated block copolymer 1 obtained in Production Example 1 (styrene content of 20% by mass, Mw 98000, "vinyl bond density of 0.87 g/cm3 High-density polyethylene: HDPE: bio-polyethylene (biobased-PE): product name "SHE150", manufactured by Braskem: melt flow rate (MFR) of 1 g/10 min (190° C., 2.16 kgf)

Antioxidant: product name "ADK STAB AO-60", manufactured by ADEKA corporation

From Table 2, the molded articles produced in Examples 2 to 10 were excellent in impact resistance, in particular, impact resistance at a low temperature (-20° C. and -40° C.).

Meanwhile, the molded article produced in Comparative Example 7 was not good in impact resistance, in particular, impact resistance at a low temperature (−20° C. and −40° C.).

Industrial Applicability

The polypropylene-based resin composition of the present invention is a polypropylene-based resin composition good in impact resistance, in particular, impact resistance at a low temperature. Then, also, the polypropylene resin composition containing the hydrogenated block copolymer of the present invention has the above-mentioned good properties and thus is useful as a material for various products such as machine parts or automobile parts.

The invention claimed is:

1. An injection-molded article containing a polypropylene-based resin composition comprising:
- a polypropylene-based polymer (A), an ethylene-a-olefin copolymer rubber (B), and a hydrogenated block copolymer (C),
- wherein the hydrogenated block copolymer (C) is a hydrogenated product of a block copolymer
  - having at least one polymer block (C-1) mainly composed of an aromatic vinyl compound unit, and
  - having at least one polymer block (C-2) mainly composed of a butadiene (Bd) unit and an isoprene (Ip) unit,
- a content of the aromatic vinyl compound unit in the hydrogenated block copolymer (C) is less than 30% by mass, and
- a vinyl bond amount of the polymer block (C-2) is 20% or less;
- wherein the content of the polypropylene-based polymer (A) in the polypropylene-based resin composition is 50 to 90% by mass.

2. The injection-molded article according to claim 1, wherein a content of the ethylene-α-olefin copolymer rubber (B) is 1 to 50 parts by mass relative to 100 parts by mass of the polypropylene-based polymer (A), and a content of the hydrogenated block copolymer (C) is 1 to 50 parts by mass relative to 100 parts by mass of the polypropylene-based polymer (A).

3. The injection-molded article according to claim 1, wherein a melt flow rate value (MFR) obtained under conditions of a temperature of 230° C. and a load of 2.16 kgf in accordance with JIS K7210 is 3 to 200 g/10 min.

4. The injection-molded article according to claim 1, wherein the polypropylene-based polymer (A) has a melt flow rate value (MFR) of 1 to 200 g/10 min, which is obtained under conditions of a temperature of 230° C. and a load of 2.16 kgf in accordance with JIS K7210.

5. The injection-molded article according to claim 1, wherein the ethylene-a-olefin copolymer rubber (B) has a melt flow rate value (MFR) of 0.1 to 50 g/10 min, which is obtained under conditions of a temperature of 230° C., and a load of 2.16 kgf in accordance with JIS K7210.

6. The injection-molded article according to claim 1, wherein the ethylene-a-olefin copolymer rubber (B) is at least one type selected from the group consisting of an ethylene-propylene copolymer, an ethylene-butene copolymer and an ethylene-octene copolymer.

7. The injection-molded article according to claim 6, wherein the ethylene-a-olefin copolymer rubber (B) is an ethylene- octene copolymer.

8. The injection-molded article according to claim 1, further comprising high-density polyethylene.

9. The injection-molded article according to claim 1, wherein the hydrogenated block copolymer (C) has a melt flow rate value (MFR) of 0.1 to 50 g/10 min, which is obtained under conditions of a temperature of 230° C. and a load of 2.16 kgf in accordance with JIS K7210.

10. The injection-molded article according to claim 1, wherein the hydrogenated block copolymer (C) is a triblock copolymer of polystyrene-hydrogenated butadiene/isoprene copolymer-polystyrene, or a diblock copolymer of polystyrene-hydrogenated butadiene/isoprene copolymer.

11. An interior-exterior decorative material for automobiles, which includes the injection-molded article according to claim 1.

12. The injection-molded article of claim 1,
- wherein the flexural modulus of the injection-molded article is 826 MPa or higher.

13. A polypropylene-based resin composition comprising:
- a polypropylene-based polymer (A), an ethylene-α-olefin copolymer rubber (B), and a hydrogenated block copolymer (C),
- wherein the hydrogenated block copolymer (C) is a hydrogenated product of a block copolymer
  - having at least one polymer block (C-1) mainly composed of an aromatic vinyl compound unit, and
  - having at least one polymer block (C-2) mainly composed of a butadiene (Bd) unit and an isoprene (Ip) unit,
- a content of the aromatic vinyl compound unit in the hydrogenated block copolymer (C) is less than 30% by mass, and
- a vinyl bond amount of the polymer block (C-2) is 20% or less;
- wherein the polypropylene-based resin composition has a flexural modulus of 826 MPa or higher.

* * * * *